United States Patent [19]
Makinson

[11] 4,063,606
[45] Dec. 20, 1977

[54] ANTI-HYDROPLANING DEVICE

[76] Inventor: Ruth G. Makinson, 3710 Bodega Ave., Petaluma, Calif. 94952

[21] Appl. No.: 703,371

[22] Filed: Sept. 13, 1976

[51] Int. Cl.² .............................................. B60B 39/00
[52] U.S. Cl. ..................................... 180/1 R; 291/1; 291/3; 280/727
[58] Field of Search .................. 291/1, 3; 180/82 R, 180/1 R; 280/154.5 R, 727

[56] References Cited
U.S. PATENT DOCUMENTS

| | | | |
|---|---|---|---|
| 1,486,852 | 3/1924 | Barlow | 291/1 |
| 3,545,561 | 12/1970 | Bradley | 180/1 R X |
| 3,680,885 | 10/1972 | DeCarli et al. | 280/727 |

*Primary Examiner*—Philip Goodman
*Assistant Examiner*—Donn McGiehan

[57] ABSTRACT

An Anti-Hydroplaning Device System for a vehicle comprising a blower driven by the engine of the vehicle. A pair of hoses are connected to the blower and each terminate in a nozzle disposed immediately ahead of the traction portion of the vehicle wheel and pivot therewith, whereby surface water is dispersed prior to engagement by the vehicle tire.

3 Claims, 2 Drawing Figures

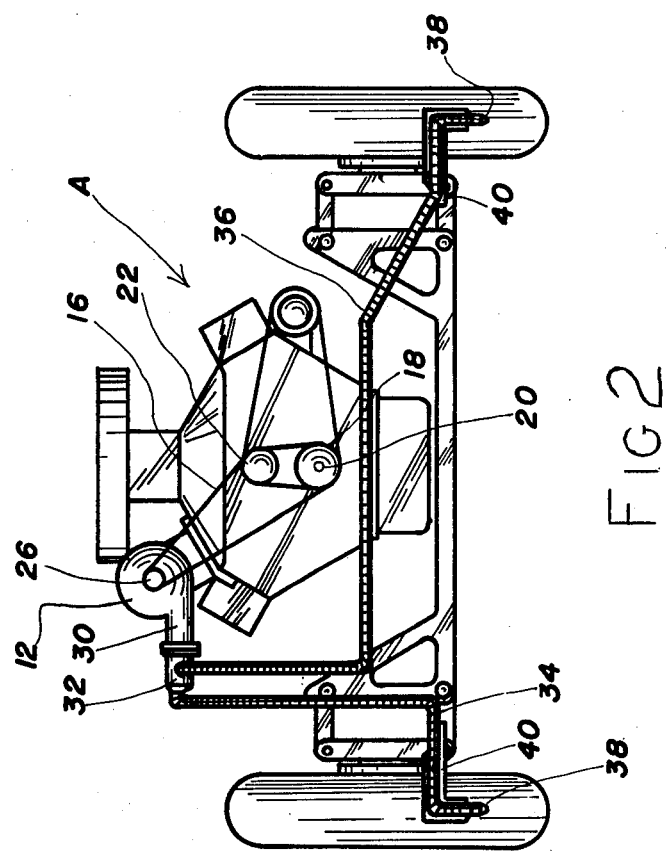

ANTI-HYDROPLANING DEVICE

BACKGROUND OF THE INVENTION

A serious hazard in driving motor vehicles or ground-maneuvering aircraft in foul weather, resides in the danger of hydroplaning wherein the wheels of a vehicle are actually lifted out of engagement with the pavement creating a high risk of dangerous skids or spins.

OBJECT OF THE INVENTION

It is an object of this invention to provide a system for reducing the hazards of driving over surfaces with water disposed thereon.

It is a further object of this invention to provide a system for reducing the likelihood of hydroplaning.

Other objects and advantages of this invention become apparent from the description to follow, particularly when read in conjunction with the accompanying drawings.

BRIEF SUMMARY OF THE INVENTION

In carrying out this invention, I provide a high capacity blower to which are connected at least one pair of hoses. The hoses terminate in nozzles which are disposed immediately ahead of the traction portion of the vehicle tires whereby a high velocity jet of air is directed ahead of the tires to disperse any surface water disposed thereon. The hose nozzles are carried on supports which are connected to the steering linkage of the motor vehicle, whereby the nozzles swing as the wheels turn, to remain disposed immediately ahead of the tire as the vehicle is in a turning mode.

BRIEF DESCRIPTION OF THE DRAWINGS

In the drawing:

FIG. 2 is a front view of the vehicle showing disposition of the nozzles with respect to the vehicle wheels.

DESCRIPTION OF A PREFERRED EMBODIMENT

Figure 1:
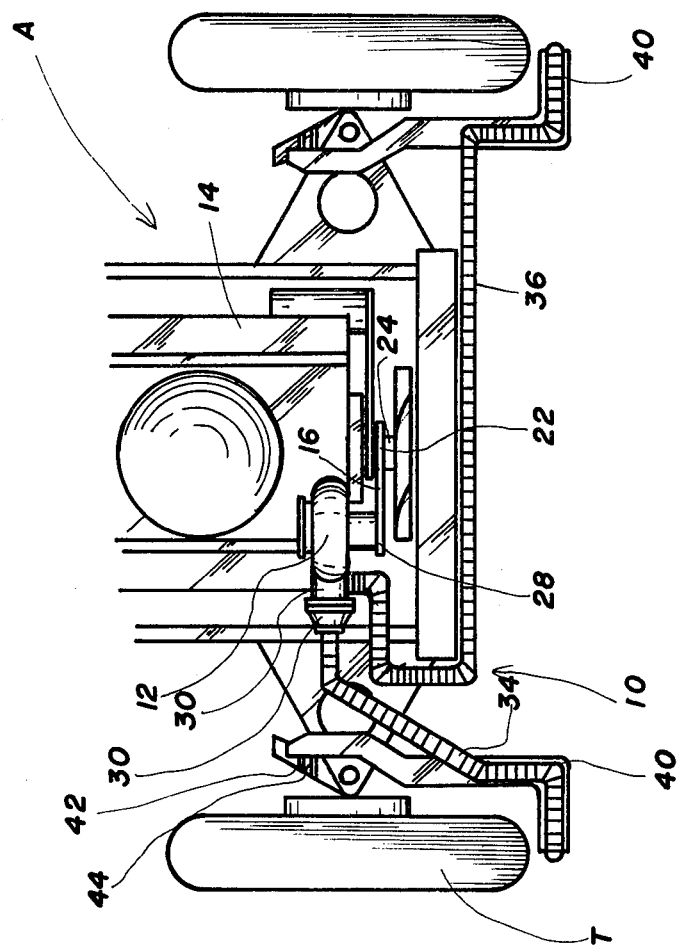
FIG. 1 is top view of an automotive engine and chasis with my system mounted thereof.

Referring now to the drawings with greater particularity, the Anti-Hydroplaning Device 10 of this invention includes a high capacity blower 12 which is mounted on the vehicle engine 14 to be driven by a belt 16 from a pulley 18 carried on the crankshaft 20, through an idler pulley 22 of the fan shaft 24. The belt 16 drives the pulley 26 and the blower 12 may be activated by energization of an electro-magnetic clutch 28 or the like.

Connected to the outlet 30 of the blower 12 is a diverter tube 32 which separates the stream of high velocity air into two paths to be forced through the flexible hoses 34 and 36, each of which terminates in a high velocity nozzle 38. The hoses and nozzles supported on brackets or saddles 40 which are mounted at 42 on the steering arms 44 of the vehicle A whereby the hose nozzles 38 will be disposed immediately ahead of the traction portion of the tires T despite the tires being moved through a turning configuration.

In operation, in the event of rain, the operator engages a switch on the dashboard (not shown) which activates the electro-magnetic 28 starting the blower 12. Thus, high velocity streams of air are directed onto the pavement immediately ahead of the vehicle tires T and, because of the mounting on the steering linkage 44, this is accomplished even as the vehicles are going around the corners when chances of skids are greatest.

While this invention has been described in conjunction with a preferred embodiment thereof, it is obvious that modifications and changes therein may be made by those skilled in the art without departing from the spirit and scope of my invention as defined by the claims appended hereto.

What I claim as invention is:

1. A hydroplane prevention system for a vehicle comprising:
    a source of air pressure;
    a hose connected to such source and terminating in a nozzle disposed immediately ahead of the traction portion of a vehicle wheel;
    a second hose connected to such source and terminating in a nozzle disposed immediately ahead of the traction portion of a second vehicle wheel; and
    means supporting each said nozzle on a steering linkage of the vehicle to remain in front of said vehicle wheels through turning movements thereof.

2. The system defined by claim 1 wherein:
    said source of air pressure comprises a blower driven by the drive means for said vehicle.

3. The system defined by claim 2 including:
    selectively operable means for activating said blower.

* * * * *